United States Patent [19]

Maruyama et al.

[11] E Patent Number: Re. 33,094

[45] Reissued Date of Patent: Oct. 17, 1989

[54] ELECTROPHOTOGRAPHIC MEMBER WITH ALPHA-SI LAYERS

[75] Inventors: Eiichi Maruyama, Kodaira, Japan; Sachio Ishioka, Burlingame, Calif.; Yoshinori Imamura, Suarashi, Japan; Hirokazu Matsubara, Hamuramachi, Japan; Yasuharu Shimomoto, Hamamatsu, Japan; Shinkichi Horigome, Tachikawa, Japan; Yoshio Taniguchi, Hino, Japan

[73] Assignee: Hitachi, Ltd., Tokyo, Japan

[21] Appl. No.: 162,312

[22] Filed: Sep. 11, 1986

Related U.S. Patent Documents

Reissue of:

[64] Patent No.: 4,378,417
Issued: Mar. 29, 1983
Appl. No.: 254,294
Filed: Apr. 15, 1981

[30] Foreign Application Priority Data

Apr. 16, 1980 [JP] Japan ..... 55-49236

[51] Int. Cl.[4] ..... G03G 5/082

[52] U.S. Cl. ..... 430/57; 252/501.1; 427/39; 427/74; 430/84; 430/133; 430/136

[58] Field of Search ..... 430/57, 84, 133, 136; 252/501.1; 427/39, 74

[56] References Cited

U.S. PATENT DOCUMENTS

| | | | |
|---|---|---|---|
| 4,217,374 | 8/1980 | Ovshinsky et al. | 430/57 X |
| 4,225,222 | 9/1980 | Kempter | 430/57 X |
| 4,265,991 | 5/1981 | Hirai et al. | 430/84 X |
| 4,289,822 | 9/1981 | Shimada et al. | 427/74 X |
| 4,451,546 | 5/1984 | Kawamura et al. | 430/57 X |
| 4,673,628 | 6/1987 | Inoue et al. | 430/57 X |

*Primary Examiner*—Roland E. Martin
*Attorney, Agent, or Firm*—Antonelli, Terry & Wands

[57] ABSTRACT

In an electrophotographic member employing an amorphous silicon photoconductive layer, a part which is at least 10 nm thick inwardly of the amorphous silicon layer from the surface (or interface) of the amorphous silicon layer is made of amorphous silicon which has an optical forbidden band gap of at least 1.6 eV and a resistivity of at least $10^{10}$ Ω.cm. The electrophotographic member exhibits a satisfactory resolution and good dark-decay characteristics. Further, a region which has an optical forbidden band gap narrower than that of the amorphous silicon forming the surface (or interface) region is disposed within the amorphous silicon layer to a thickness of at least 10 nm, whereby the sensitivity of the electrophotographic member to longer wavelengths of light can be enhanced.

16 Claims, 3 Drawing Sheets

ELECTROPHOTOGRAPHIC MEMBER WITH ALPHA-SI LAYERS

Matter enclosed in heavy brackets [ ] appears in the original patent but forms no part of this reissue specification; matter printed in italics indicates the additions made by reissue.

BACKGROUND OF THE INVENTION

This invention relates to the structure of a photoconductive layer for use in an electrophotographic sensitive plate. More particularly, it relates to an electrophotographic member which employs amorphous silicon for a photoconductive layer.

As photoconductive materials to be used for electrophotographic members, there have heretofore been inorganic substances such as Se, CdS and ZnO and organic substances such as polyvinyl carbazole (PVK) and trinitrofluorenone (TNF). They exhibit high photoconductivities. However, in case of forming photoconductive layers by using these materials as they are or by dispersing the powders thereof in binders of organic substances, there has been the disadvantage that the layers exhibit insufficient hardnesses, so they have their surfaces flawed or wear away during the operations as the electrophotographic members. In addition, many of these materials are substances harmful to the human body. It is therefore unfavorable that the layers wear away to adhere on copying paper even if in small amounts. In order to improve these disadvantages, it has been proposed to employ amorphous silicon for the photoconductive layer (refer to, for example, the official gazette of Japanese Laid-open Patent Application No. 54-78135). The amorphous silicon layer is higher in hardness than the aforecited conventional photoconductive layers and is scarcely toxic, so that the disadvantages of the conventional photoconductive layers are improved. The amorphous silicon layer, however, exhibits a dark resistivity which is too low for the electrophotographic member. The amorphous silicon layer having a comparatively high resistivity on the order of $10^{10}\Omega$.cm exhibits a photoelectric gain being too low, and only an unsatisfactory one is obtained as the electrophotographic member. In order to overcome this disadvantage, there has been proposed a layer structure wherein at least two sorts of amorphous silicon layers having different conductivity types such as the n-type, $n^+$-type, p-type, $p^+$-type and i-type are formed into a junction and wherein photo-carriers are generated in a depletion layer formed in the junction part (refer to, for example, the official gazette of Japanese Laid-open Patent Application No. 54-121743). However, in case where the depletion layer is formed by putting the two or more layers of the different conductivity types into the junction in this way, it is difficult to form the depletion layer in the surface of the photoconductive layer. Therefore, the important surface part of the photoconductive layer which must hold a charge pattern exhibits a low resistivity to give rise to the lateral flow of the charge pattern. It is consequently feared that the resolution of electrophotography will degrade.

SUMMARY OF THE INVENTION

A first object of this invention is to provide an electrophotographic member which eliminates the fear of the degradation of the resolution in the prior-art electrophotographic member employing amorphous silicon and which has good dark decay characteristics.

A second object of this invention is to provide an electrophotographic member which can enhance its sensitivity to longer wavelengths of light.

A first essential point of the electrophotographic member of this invention is as follows. That part of an amorphous-silicon photoconductive layer constituting the electrophotographic member which is at least 10 nm thick inwardly of the photoconductive layer from the surface thereof on a side to store charges is made of amorphous silicon which has an optical forbidden band gap of at least 1.6 eV and a resistivity of at least $10^{10}\Omega$.cm.

In order to accomplish the second object of this invention, the following structure is adopted in addition to the first essential point mentioned above. Within the amorphous-silicon photoconductive layer constituting the electrophotographic member, a region of amorphous silicon whose optical forbidden band gap does not exceed that of the amorphous silicon forming the surface region is disposed at a thickness of at least 10 nm. By forming the region of the narrow optical forbidden band gap within the photoconductive layer, the sensitivity to longer wavelengths of light can be enhanced. Further, it is useful for preventing the injection of charges from an electrode or the like into the photoconductive layer that an interface region located on the opposite side to the aforecited surface side is made of the amorphous silicon which has the optical forbidden band gap of at least 1.6 eV and the resistivity of at least $10^{10}\Omega$.cm.

DETAILED DESCRIPTION OF THE INVENTION

Figure 1:
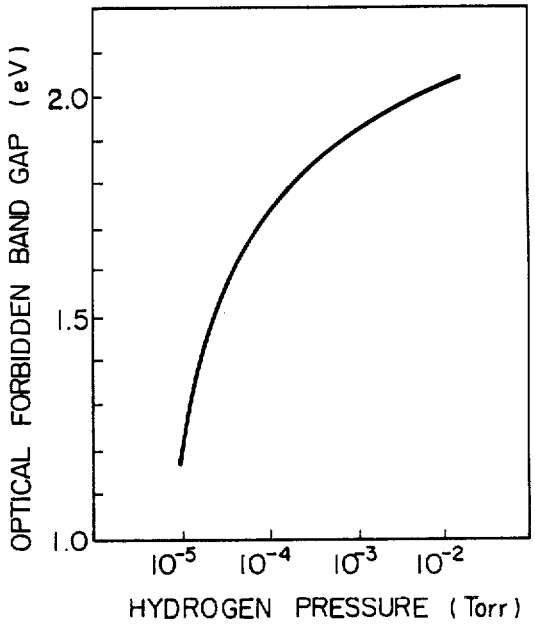
FIG. 1 is a graph showing the relationship between the pressure of hydrogen during sputtering and the optical forbidden band gap of an amorphous silicon layer formed.

An amorphous silicon layer which is made only of the pure silicon element exhibits a high localized state density, and has almost no photoconductivity. However, the amorphous silicon layer can have the localized states reduced sharply and be endowed with a high photoconductivity by doping it with hydrogen, or it can be turned into such conductivity types as the p-type and n-type by doping it with impurities. As elements effective to reduce the localized state density in the amorphous silicon as described above, there are the elements of the so-called halogen group such as fluorine, chlorine, bromine and iodine, in addition to hydrogen. Although the halogen group has the effect of reducing the localized state density in the amorphous silicon, it cannot greatly vary the optical forbidden band gap of the amorphous silicon. In contrast, hydrogen can sharply increase the optical forbidden band gap of the amorphous silicon or can increase the resistivity thereof by doping the amorphous silicon therewith. Therefore, it is especially useful for obtaining a high-resistivity photoconductive layer as in this invention.

Well-known methods for forming the amorphous silicon containing hydrogen (usually, expressed as a-Si:H) are (1) the glow discharge process which is based on the low-temperature decomposition of monosilane $SiH_4$, (2) the reactive sputtering process in which the sputter-evaporation of silicon is performed in an atmosphere containing hydrogen, (3) the ion-plating process, etc. Usually, the amorphous silicon layers prepared by these methods contain several atomic-% to several tens atomic-% of hydrogen and also have optical forbidden band gaps which are considerably greater than 1.1 eV of the pure silicon. The localized state density in the pure amorphous silicon containing no hydrogen is presumed to be on the order of $10^{20}/cm^3$. Supposing that hydrogen atoms extinguish the localized states at 1:1 in case of doping such amorphous silicon with hydrogen, all the localized states ought to be extinguished with a hydrogen-doping quantity of approximately 0.1 atomic-%. However, it is for the first time when the hydrogen content exceeds approximately 1 atomic-% that amorphous silicon useful as a photoconductor is actually obtained owing to the appearance of the photoconductivity and to the occurrence of the variation of the optical forbidden band gap. Hydrogen can be contained up to approximately 50 atomic-%, but a content of at most 30 atomic-% is practical. A material in which part of silicon is substituted by germanium, carbon or the like can also be used for the electrophotographic member. Useful as the quantity of the substitution by germanium or carbon is within 30 atomic-%.

In order to vary the hydrogen content of the amorphous silicon layer, there may be controlled the substrate temperature, the concentration of hydrogen in an atmosphere, the input power, etc. in the case of forming the layer by the use of any of the layer forming methods. Among the layer forming methods mentioned above, one which is excellent in the process controllability and which can readily produce a photoconductive amorphous silicon layer of high resistivity and good quality is the reactive sputtering process.

The inventors could produce an a-Si:H layer having a resistivity of at least $10^{10}\Omega$.cm permitting the use as the electrophotographic member, by the reactive sputtering of silicon in a mixed atmosphere consisting of argon and hydrogen. The layer is the so-called intrinsic semiconductor which exhibits the high resistivity and simultaneously a high photoconductivity and whose Fermi level lies near the middle of the forbidden band thereof. In a semiconductor of fixed forbidden band gap, the highest resistivity is usually presented in the intrinsic (i-type) state, and the resistivity lowers when the conductivity type is changed into the n-type or p-type by doping the semiconductor with an impurity. Accordingly, if a layer having in the intrinsic state a resistivity high enough to permit the use as the electrophotographic member is obtained, it becomes unnecessary to intentionally utilize a depletion layer, and hence, it becomes unnecessary to form the electrophotographic member by stacking two or more amorphous silicon layers of different conductivity types. This invention makes improvements in the spectral sensitivity and improvements in the dark decay characteristics by employing the a-Si:H layer which has the high resistivity necessary for the electrophotographic member even as the single layer.

Now, in a light receiving device of the storage type such as the electrophotographic member, the resistivity of the photoconductive layer must satisfy the following two required values:

(1) The resistivity of the photoconductive layer needs to be above approximately $10^{10}\Omega$.cm lest charges stuck on the surface of the layer by the corona discharge or the like should be discharged in the thickness direction of the layer before exposure.

(2) Also the sheet resistance of the photoconductive layer must be sufficiently high lest a charge pattern formed on the surface of the photoconductive layer upon the exposure should disappear before developing on account of the lateral flow of the charges. In terms of the resistivity, this becomes above approximately $10^{10}\Omega$.cm as in the preceding item.

Both the above items concern the migrations of the charges in the dark before and after the exposure, and the former shall be called the "dark decay in the thickness direction of the layer" and the latter the "dark decay in the surface direction of the layer".

In order to meet the conditions of the two items, the resistivity of and near the surface of the photoconductive layer to hold the charges must be above approximately $10^{10}\Omega$.cm, but the resistivity of at least $10^{10}\Omega$.cm need not be possessed uniformly in the thickness direction of the layer. Letting $\pi_\perp$ denote the time constant of the dark decay in the thickness direction of the layer, $C_\perp$ denote the capacitance per unit area of the layer and $R_\perp$ denote the resistance in the thickness direction per unit area of the layer, the following relation holds:

$$\pi_\perp = R_\perp C_\perp \quad (1)$$

$\pi_\perp$ may be sufficiently long as compared with the period of time from the charging to the developing, $R_\perp$ may be sufficiently great with the thickness direction of the layer viewed macroscopically.

The inventors have revealed that, as a factor which determines the macroscopic resistance in the thickness direction of the layer in a high-resistivity thin-film device such as the electrophotographic member, charges to be injected from an interface with an electrode play an important role besides the resistivity of the layer itself. It has been revealed that, in order to prevent the injection of charges from an interface on the side opposite to the charged surface or the side of a substrate holding the photoconductive layer in the electrophotographic member employing amorphous silicon, a more satisfactory effect is obtained by making the resistivity of the amorphous silicon layer in the vicinity of the interface with the substrate a high value of at least $10^{10}\Omega$.cm. Ordinarily, such high-resistivity region is the intrinsic semiconductor (i-type). This region functions as a layer which blocks the injection of charges from the electrode into the photoconductive layer, and it needs to be at least 10 nm thick lest the charges should pass through the region due to the tunnel effect. Further, in order to effectively block the injection of charges from the electrode, it is also effective to interpose a thin layer (usually, termed "blocking layer") of $SiO_2$, $CeO_2$, $Sb_2S_3$, $Sb_2Se_3$, $As_2S_3$, $As_2Se_3$ or the like between the electrode and the amorphous silicon layer.

It has become apparent from the above description that, in order to suppress the dark decay in the thickness direction of the photoconductive layer and the dark decay in the surface direction, the resistivity in the vicinity of the surface (or interface) of the amorphous silicon layer must be as high as at least $10^{10}\Omega$.cm. In this regard, the required thickness of the high-resistivity portion is not always fixed because it is dependent upon the resistivity of the low-resistivity portion adjoining the high-resistivity portion. Since, however, the existence of the high-resistivity portion is insignificant at a thickness less than 10 nm at which the tunnel effect begins to be observed, the high-resistivity portion needs to be at least 10 nm thick. When a close proximity to the surface of the amorphous silicon layer, for example, a region of several atomic layers is considered, it is possible that the adsorption of an atmosphere gas modulates the conductivity to establish a low resistivity. In view of the principle of electrophotography, however, it should be construed a requisite of this invention that a sufficiently high resistance is observed when the surface resistance is measured by an ordinary method.

Figure 2:
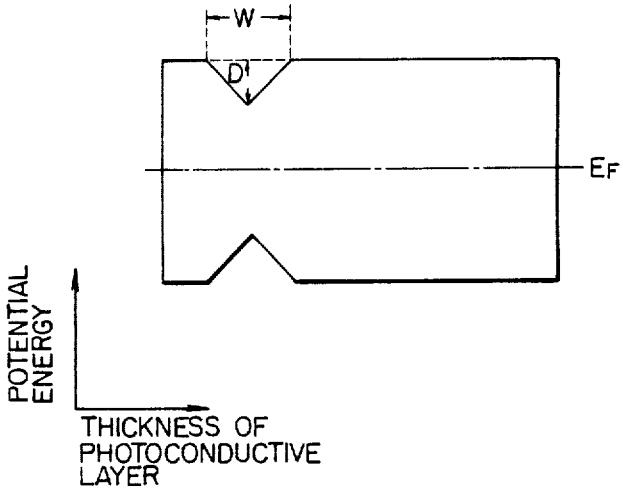
FIG. 2 is a diagram showing the energy band model of an amorphous-silicon photoconductive layer in this invention, FIGS, 3, 5 and 6 are sectional views each showing the structure of an electrophotographic member according to this invention.

In this invention, the resistivity in the vicinity of the surface (or interface) of the amorphous silicon layer must be sufficiently high, but the resistivity of the interior of the layer need not always be high. On the basis of the principle of electrophotography, the macroscopic resistance $R_{\perp}$ of the photoconductive layer may meet Expression (1). This is convenient for another object of this invention or improvements in the spectral sensitivity characteristics on the ground stated below. Usually, the a-Si:H layer having the high resistivity of at least $10^{10}\Omega$.cm has an optical forbidden band gap of approximately 1.7 eV and is insensitive to light of wavelengths longer than the long wavelength region of the visible radiation. This fact is very inconvenient in case of using the a-Si:H layer as a photoconductive layer for a laser beam printer equipment which employs as its light source a semiconductor laser having a wavelength near 800 nm. On the other hand, it is difficult to endow an a-Si:H layer highly sensitive to the longer wavelength light with the high resistivity of at least $10^{10}\Omega$.cm. To the end of solving this contradiction, it has been found out by the inventors that the spectral sensitivity characteristics of an electrophotographic sensitive plate are shifted onto the longer wavelength side by forming a region exhibitive of a longer wavelength light-sensitivity within the a-Si:H layer and yet holding the macroscopic resistance of the whole layer sufficiently high. FIG. 1 illustrates the relationship between the pressure of hydrogen in an atmosphere in the reactive sputtering process and the optical forbidden band gap of an a-Si:H layer formed at that time. As understood from the graph, a region of small optical forbidden band gap can be formed within a photoconductive layer in such a way that the hydrogen pressure is raised at the initial stage of the formation of the layer, that it is thereafter lowered temporarily and that it is raised again at the final stage of the formation of the layer. The minimum value of the optical forbidden band gap realizable with this method is 1.1 eV which is the optical forbidden band gap of the pure silicon. When the region of narrow forbidden band gap has been formed within the photoconductive layer in this manner, the longer wavelength light is absorbed in this region to generate electron-hole pairs. The situation is illustrated as an energy band model in FIG. 2. Since, in both the region of wide forbidden band gap and the region of narrow forbidden band gap, the resistances of the portions themselves are desired to be as high as possible, the photoconductive layer should more preferably be fully intrinsic (i-type). At this time, the energy band model becomes a shape constricted to be vertically symmetric with respect to the Fermi level. Photocarriers generated in the constriction or the region of narrow forbidden band gap are captured in the region by a built-in field existing therein. In order to draw the photo-carriers out of the region of narrow forbidden band gap with an external electric field and to utilize them as effective photo-carriers, the external electric field must be greater than the built-in field of the region of narrow forbidden band gap. Conversely stated, in case of forming the region of narrow forbidden band gap, the built-in field to arise therein must become smaller than the external electric field. The built-in field of the region of narrow forbidden band gap depends upon the depth (potential difference) D and the width W of the region in the energy band model. An abrupt change of the band gap generates a great built-in field, whereas a gentle change of the band gap generates a small built-in field. When the shape of the region of narrow forbidden band gap is approximately by an isosceles triangle, the condition for drawing out the photo-carriers is:

$$E_a \geqq 2D/W \qquad (2)$$

where $E_a$ denotes the external electric field.

It is desirable from the utilization factor of incident light that, within the amorphous-silicon photoconductive layer, the portion in which the region of narrow forbidden band gap exists lies as close to the incident plane of light as possible. However, in case where the incident light is monochromatic as in, for example, the laser beam printer equipment, and where the coefficient of absorption in the portion other than the region of narrow forbidden band gap is small, there is no considerable difference in effect wherever the region lies in the thickness direction within the layer. In order to generate effective photo-carriers in the region of narrow forbidden band gap, the width W of this region needs to be, in effect, at least 10 nm. The maximum limit of the width of the region of narrow forbidden band gap is, of course, the whole thickness of the amorphous silicon layer, but the width W of the region is desired to be at most ½ of the whole thickness of the layer in order to keep the total resistance $R_{\perp}$ in the thickness direction sufficiently high.

The whole thickness of the amorphous-silicon photoconductive layer is determined by the surface potential, which in turn varies depending upon the kind of toner used and the service conditions of the photoconductive layer. However, the withstand voltage of the amorphous silicon layer is considered to be 10 V–50 V per μm. Accordingly, when the surface potential is 500 V, the entire layer thickness becomes 10 μm–50 μm. Values of the entire layer thickness exceeding 100 μm are not practical.

Hereunder will be described the concrete structure of an electrophotographic member having an amorphous-silicon photoconductive layer.

Figure 3:
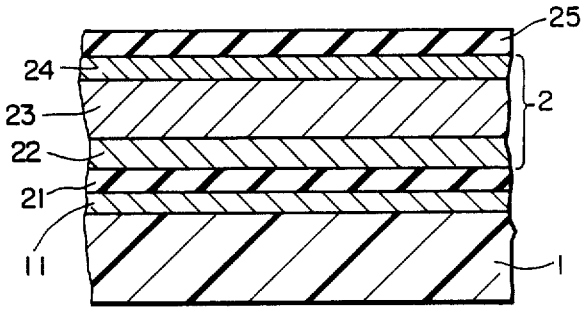

FIG. 3 is a sectional view showing a typical example of the electrophotographic member.

Referring to FIG. 3, numeral 1 designates a substrate, and numeral 2 a photoconductive layer including an amorphous silicon layer. The substrate 1 may be any of a metal plate such as aluminum, stainless steel or nichrome plate, an organic material such as polyimide, glass, ceramics etc. In case where the substrate is an electrical insulator, an electrode 11 needs to be deposited on the substrate. In case where the substrate is a conductor, it can serve also as the electrode. Used as the electrode is a thin film of a metal material such as aluminum and chromium, or a transparent electrode of an oxide such as $SnO_2$ and In-Sn-O. The photoconductive layer 2 is disposed on the electrode. In case where the substrate 1 is light-transmissive and the electrode 11 is transparent, light to enter the photoconductive layer 2 is sometimes projected through the substrate 1. In this example, the photoconductive layer 2 has a three-layered structure. The first layer 21 existent on the side of the substrate 1 is a layer for suppressing the injection of excess carriers from the substrate side. As this layer, a layer of a high-resistivity oxide, sulfide or selenide such as SiO, $SiO_2$, $Al_2O_3$, $CeO_2$, $V_2O_3$, $Ta_2O$, $As_2Se_3$ and $As_2S_3$ is used, or a layer of an organic substance such as polyvinyl carbazole is sometimes used. The last layer 25 is a layer for suppressing the injection of charges from the surface side. For this layer, there are similarly used SiO, $SiO_2$, $Al_2O_3$, $CeO_2$, $V_2O_3$, $Ta_2O$, $As_2Se_3$, $As_2S_3$, polyvinyl carbazole, etc. These layers 21 and 25 serve to improve the electrophotographic characteristics of the photoconductive layer of this invention. However, they are not always absolutely indispensable, but essentially the presence of layers 22, 23 and 24 satisfies the requirements of this invention. All the layers 22, 23 and 24 are layers whose principal constituents are amorphous silicon. Each of the layers 22 and 24 is a layer which exhibits an optical forbidden band gap of at least 1.6 eV and a resistivity of at least $10^{10}\Omega$.cm and which has a thickness of at least 10 nm. The layer 23 is a layer whose optical forbidden band gap is at least 1.1 eV and does not exceed that of the layer 22 or 24 and which has a thickness of at least 10 nm. Naturally, the resistivity of the layer 23 can be less than $10^{10}\Omega$.cm. Even in that case, however, no bad influence is exerted on the dark decay characteristics as the electrophotographic member owing to the presence of the layers 22 and 24, which forms the main point of this invention. It is sometimes the case that the amorphous silicon layer is doped with carbon or a very small amount of boron in order to increase the resistivity and the optical forbidden band gap of each of the layers 22 and 24, or that the amorphous silicon layer is doped with germanium in order to reduce the optical forbidden band gap of the layer 23. However, it is necessary for ensuring photoconductive characteristics that at least 50 atomic-% of silicon is contained on the average within the layer. As long as this requirement is fulfilled, produced layers fall within the scope of this invention whatever other elements they may contain.

Figure 4:
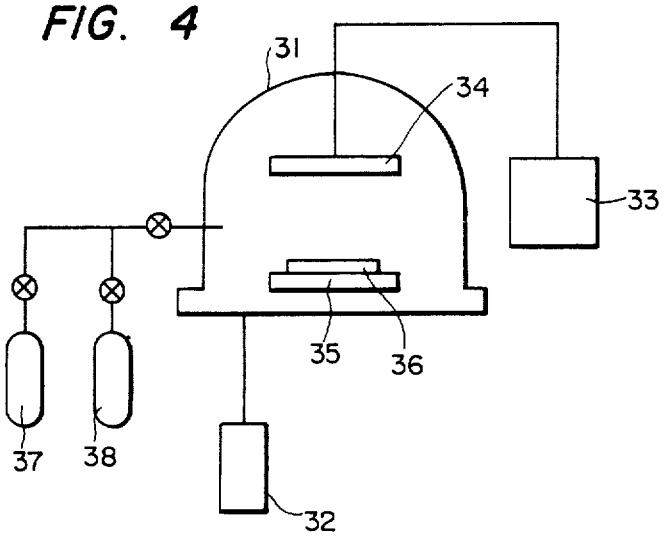
FIG. 4 is a view for explaining a reactive-sputtering equipment.

As methods for forming the amorphous silicon layer containing hydrogen, the process exploiting the decomposition of $SiH_4$ by the glow discharge, the reactive sputtering process, the ion-plating process etc. have been known as stated in the beginning. With any of the methods, a layer having the best photoelectric conversion characteristics is obtained when the substrate temperature during the formation of the layer is 150°-250° C. In case of the glow discharge process, the hydrogen content of the formed layer is intensely dependent upon the substrate temperature during the formation of the layer. It is therefore difficult to determine the photoelectric conversion characteristics and the hydrogen content of the layer independently of each other. A layer of good photoelectric conversion characteristics has as low a resistivity as $10^6$-$10^7\Omega$.cm and is unsuitable for electrophotography. Therefore, such a consideration as doping the layer with a slight amount of boron to raise its resistivity is also necessary. In contrast, the reactive sputtering process and the ion-plating process can independently determine the substrate temperature during the formation of the layer and the hydrogen content of the layer, so that they are especially effective in case where the layers of different optical forbidden band gaps need to be stacked in the thickness direction of the layer as in this invention. Further, the reactive sputtering process can form a uniform layer of large area by employing a sputtering target of sufficiently large area. It can therefore be said particularly useful for forming the photoconductive layer for electrophotography. Usually, the reactive sputtering is performed by the use of an equipment as shown in FIG. 4. Referring to the figure, numeral 31 designates a bell jar, numeral 32 an evacuating system, numeral 33 a radio-frequency power source, numeral 34 a sputtering target, numeral 35 a substrate holder, numeral 36 a substrate, and numerals 37 and 38 gas cylinders containing gases to be introduced, respectively. Sputtering equipment include, not only the structure which serves to perform the sputter-evaporation on the flat substrate as exemplified in the figure, but also a structure which can perform the sputter-evaporation on a cylindrical or drum-shaped substrate. Therefore, they may be properly employed according to intended uses.

The reactive sputtering is carried out by evacuating the bell jar 31, introducing hydrogen and such an inert gas as argon thereinto, and supplying a radio-frequency voltage from the radio-frequency power source 33 to cause a discharge. The frequency of the r. f. input is usually 13.56 MHz. The input power is 0.1 $W/cm^2$ – 100 $W/cm^2$. The quantity of hydrogen which is contained in a layer to be formed at this time is determined principally by the pressure of hydrogen existent during the discharge. The amorphous silicon layer containing hydrogen as is suited to this invention is produced when the hydrogen pressure during the sputtering lies in a range of from $1\times10^{-5}$ Torr to $5\times10^{-2}$ Torr. The deposition rate of the layer at this time is 1 A/sec – 30 A/sec. The total gas pressure is generally set within a range of $1\times10^{-4}$ Torr–0.1 Torr. The substrate temperature during the deposition is selected from within a range of 50° C.–400° C.

Hereunder, this invention will be concretely described in conjunction with examples.

Figure 5:
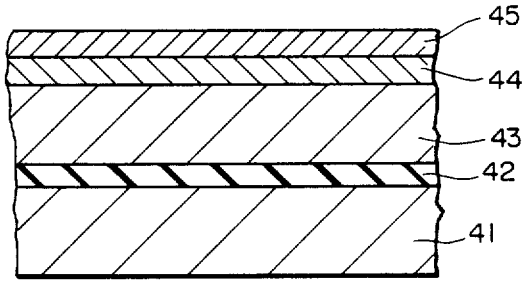

EXAMPLE 1:

FIG. 5 is a sectional view of an electrophotographic member of this example.

An aluminum cylinder whose surface was mirror-polished was heated at 300° C. in an oxygen atmosphere for 2 hours, to form an $Al_2O_3$ film 42 on the surface of the cylinder 41. The cylinder was installed in a rotary magnetron type sputtering equipment, the interior of which was evacuated up to $1\times10^{-6}$ Torr. Thereafter, whilst holding the cylinder at 200° C., an amorphous silicon film 43 was deposited thereon to a thickness of 30 μm at a deposition rate of 2 A/sec by a radio-frequency output of 13.56 MHz and 350 W in a mixed atmosphere consisting of $2\times10^{-5}$ Torr of hydrogen and $3\times10^{-3}$ Torr of argon. The amorphous silicon film had an optical forbidden band gap of 1.5 eV and a resistivity of $10^8\Omega$.cm. It had a hydrogen content of 4 atomic-%. Subsequently, while the substrate temperature was similarly held at 200° C., an amorphous silicon film 44 to a thickness of 1

μm by the radio-frequency output of 13.56 MHz and 350 W in a mixed atmosphere consisting of $2\times10^{-3}$ Torr of hydrogen and $3\times10^{-3}$ Torr of argon. This amorphous silicon film had an optical forbidden band gap of 1.95 eV and a resistivity of $10.^{11}\Omega$.cm.

Thereafter, the resultant cylinder was taken out of the sputtering equipment and was installed in a vacuum evaporation equipment. Whilst holding the substrate temperature at 80° C. under a pressure of $2\times10^{-6}$ Torr, an $As_2Se_3$ film 45 was evaporated to a thickness of 1,000 A.

Thus, the electrophotographic member was finished up.

Since the electrophotographic member of this invention has as a surface layer the amorphous silicon layer 44 whose optical forbidden band gap is at least 1.6 eV and whose resistivity is at least $10^{10}\Omega$.cm, it can establish an especially high surface potential. Table 1 lists the changes of the surface potential at the time when the amorphous silicon layer 44 has not been disposed and has had its thickness varied. The listed results were obtained by measuring the surface potential upon lapse of 1 sec. after the electrophotographic member had been charged by the corona discharge at 6.5 kV. A high surface potential signifies that charges are retained well. It is understood from the results of Table 1 that the present invention brings forth a remarkable effect.

TABLE 1

| Thickness of layer 44 | Surface potential (relative value) |
|---|---|
| No layer | 0.02 |
| 5 (nm) | 0.1 |
| 10 (nm) | 0.6 |
| 20 (nm) | 0.8 |
| 1 (μm) | 1.0 |

The decay of the surface potential after 1 sec. was below 10%, and the dark decay characteristics were satisfactory.

EXAMPLE 2:

This example will be explained with reference to FIG. 6.

On a hard glass cylinder 1, a transparent electrode of $SnO_2$ 11 was formed by the thermodecomposition of $SnCl_4$ at 450° C. The resultant cylinder was installed in a rotary sputtering equipment, the interior of which was evacuated up to $2\times10^{-6}$ Torr. Subsequently, whilst holding the cylinder at 250° C., an amorphous silicon film (hydrogen content: 17.5 atomic-%) 22 having an optical forbidden band gap of 1.95 eV and a resistivity of $10^{11}\Omega$.cm was deposited to a thickness of 500 A at a deposition rate of 1 A/sec by a radio-frequency power of 300 W (at a frequency of 13.56 MHz) in a mixed atmosphere consisting of $2\times10^{-3}$ Torr of hydrogen and $2\times10^{-3}$ Torr of argon. Thereafter, whilst holding the pressure of argon constant, the pressure of hydrogen was gradually lowered down to $3\times10^{-5}$. Torr over a period of time of 20 minutes. The amorphous silicon at the minimum hydrogen pressure (hydrogen content: 9 atomic-%) 23 had an optical forbidden band gap of 1.6 eV and a resistivity of $10^{8}\Omega$. cm. Further, whilst holding the argon pressure constant, the hydrogen pressure was gradually raised up to $2\times10^{-3}$ Torr again over 20 minutes. Under this state, the sputtering was continued to form an amorphous silicon film 24 until the whole thickness of the amorphous silicon layer became 25 μm. The region whose optical forbidden band gap was below 1.95 eV was approximately 2,400 A thick.

A film of $As_2Se_3$ or the like may well be inserted on the transparent electrode 11 as a blocking layer. A blocking layer as stated before may well be disposed on the photoconductive layer 24.

Thus, the electrophotographic member of this invention was finished up.

Figure 7:
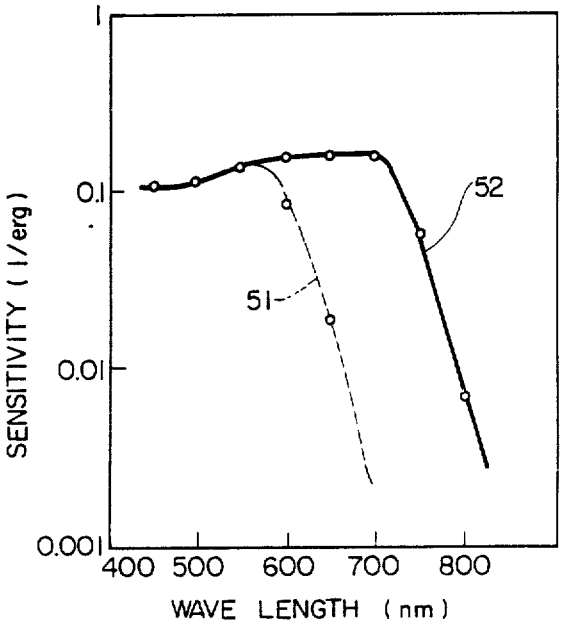
FIG. 7 is a graph showing the spectral sensitivity characteristics of an electrophotographic member according to this invention.

FIG. 7 illustrates the spectral sensitivity of the photoconductive layer formed in this way. A dotted line 51 indicates the spectral sensitivity in the case where the minimum part of the hydrogen pressure was not formed, and a solid line 52 that in the case where it was formed. As seen from the result, the sensitivity to longer wavelength light is improved.

EXAMPLE 3:

In this example, amorphous silicon containing carbon is employed for the surface and the interface of a conductive layer. The fundamental structure is as shown in FIG. 6.

On a polyimide film 1 a chrome film 11 was vacuum-evaporated to a thickness of 400 A, to prepare a substrate. The resultant layer was installed in a sputtering equipment, the interior of which was evacuated up to $5\times10^{-7}$ Torr. Thereafter, whilst holding the substrate at 150° C. and by employing a target of polycrystalline silicon containing 10% of carbon, a film of amorphous silicon-carbon 22 having an optical forbidden band gap of 2.0 eV and a resistivity of $10^{13}\Omega$.cm was formed 5 μm at a deposition rate of 3 A/sec under a radio-frequency power of 350 W in a gaseous mixture consisting of $1\times10^{-3}$ Torr of hydrogen and $4\times10^{-3}$ Torr of argon. The hydrogen content of this film was approximately 14 atomic-%. Thereafter, sputtering was performed by the use of a target made up of silicon only and in a gaseous mixture consisting of $2\times10^{-3}$ Torr of argon and $3\times10^{-3}$ Torr of hydrogen, to form a film of amorphous silicon 23 having a thickness of 60 nm and exhibiting an optical forbidden band gap of 1.95 eV as well as a resistivity of $10^{12}\Omega$.cm. Further on the film 23, a film 24 of the first amorphous silicon—carbon was formed 5 μm.

An electrophotographic member having a satisfactory resolution and good dark-decay characteristics could be realized.

Figure 6:
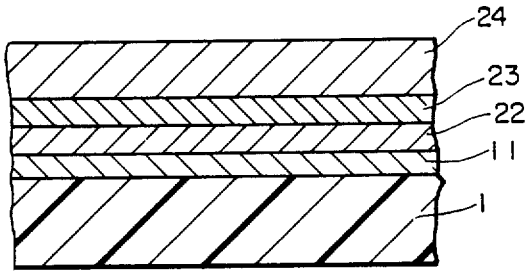

EXAMPLE 4:

Reference is had to FIG. 6.

On a hard glass cylinder 1, an $SnO_2$ transparent electrode 11 was formed by the thermodecomposition of $SnCl_4$ at 450° C. The resultant cylinder was installed in a rotary sputtering equipment, the interior of which was evacuated up to approximately $2\times10^{-6}$ Torr. Subsequently, whilst holding the cylinder at 250° C., an amorphous silicon film (hydrogen content: 17.5 atomic-%) 22 was deposited 500 A by a radio-frequency power of 13.56 MHz and 300 W in a mixed atmosphere consisting of $2\times10^{-3}$ Torr of hydrogen and $2\times10^{-3}$ Torr of argon. The optical forbidden band gap of this film was 1.95 eV, and the resistivity was $10^{11}\Omega$.cm. Thereafter, using a sputtering target in which silicon and germanium were juxtaposed, a germanium-containing amorphous silicon film 23 was deposited to a thickness of 0.1 μm. The sputtering was a gaseous mixture consisting of $1\times10^{-3}$ Torr of hydrogen and $2\times10^{-3}$ Torr of argon. The content of germanium was 30 atomic-%, and that of hydrogen was 10 atomic-%. In addition, the optical forbidden band gap was approximately 1.40 eV, and the resistivity was approximately $10^9\Omega$.cm Subsequently, an amorphous silicon film 24 was formed under the same conditions as those of the first amorphous silicon film. The thickness of the whole layer was made 25 μm. The optical forbidden band gap of the film 24 was 1.95 eV, and the resistivity was $10^{11}\Omega$.cm. When the germanium-containing amorphous silicon was used in this manner, an electrophotographic member having a satisfactory resolution and good dark-decay characteristics could be realized.

What is claimed is:

[1. In an electrophotographic member comprising at least a predetermined supporter having a conductive surface and an amorphous silicon layer which is electrically in contact with said conductive surface and which contains hydrogen and silicon as indispensable constituent elements thereof, the improvement comprising an amorphous silicon layer in which the silicon amounts to at least 50 atomic % and the hydrogen amounts to at least 1 atomic % and, at most, 50 atomic %, said amorphous layer comprising a first region and a second region, said first region being at least 10 nm thick, extending inwardly from an outer surface of said amorphous silicon layer and being made of amorphous silicon which has an optical forbidden band gap of at least 1.6 eV and a resistivity of at least $10^{10}\Omega$.cm, and said second region being located at least 10 nm from said surface of said amorphous layer, having a thickness of at least 10 nm, and being made of amorphous silicon which has an optical forbidden band gap that is smaller than that of said first region at the surface of the amorphous silicon and that is at least 1.1 eV.]

[2. An electrophotographic member according to claim 1, wherein said amorphous silicon layer is formed by a reactive sputtering process in an atmosphere containing hydrogen.]

[3. An electrophotographic member according to claim 1, wherein said amorphous silicon layer has a third region on a side opposite to said surface side formed by said first region, said third region being made of amorphous silicon which has an optical forbidden band gap of at least 1.6 eV and a resistivity of at least $10^{10}\Omega$.cm.]

[4. An electrophotographic member according to claim 1, wherein said amorphous silicon layer further contains at least one element selected from the group consisting of germanium and carbon which is substituted for silicon in an amount up to 30 atomic %.]

[5. An electrophotographic member according to claim 1, wherein said member further comprises a conducter in contact with said amorphous silicon layer.]

[6. An electrophotographic member according to claim 1, wherein said supporter includes a substrate which is a conductive material and which is in contact with said amorphous silicon layer.]

[7. An electrophotographic member according to claim 1, wherein said supporter comprises an insulating substrate and a conductive electrode formed on said substrate and in contact with said amorphous silicon layer.]

8. [An] *In an* electrophotographic member [according to claim 1,] *comprising at least a predetermined supporter having a conductive surface and an amorphous silicon layer which is electrically in contact with said conductive surface and which contains hydrogen and silicon as indispensable constituent elements thereof, the improvement comprising an amorphous silicon layer in which the silicon amounts to at least 50 atomic % and the hydrogen amounts to at least 1 atomic % and, at most, 50 atomic %, said amorphous layer comprising a first region, a second region, and a third region,*

*said first region being at least 10 nm thick, extending inwardly from an outer surface of said amorphous silicon layer and being made of amorphous silicon which has an optical forbidden band gap of at least 1.6 eV and a resistivity of at least $10^{10}\Omega$.cm;*

*said second region being located at least 10 nm from said surface of said amorphous layer, having a thickness of at least 10 nm, and being made of amorphous silicon which contains germanium and which has an optical forbidden band gap that is smaller than that of said first region at the surface of the amorphous silicon and that is at least 1.1 eV; and*

*said third region being located on a side opposite to said surface side formed by said first region and being made of amorphous silicon which has an optical forbidden band gap of at least 1.6 eV and a resistivity of at least $10^{10}\Omega$.cm, and* further comprising a layer on the side of the supporter in electrical contact with the amorphous silicon for suppressing the injection of excess carriers from the supporter side.

9. [An] *In an* electrophotographic member [according to claim 1,] *comprising at least a predetermined supporter having a conductive surface and an amorphous silicon layer which is electrically in contact with said conductive surface and which contains hydrogen and silicon as indispensable constituent elements thereof, the improvement comprising an amorphous silicon layer in which the silicon amounts to at least 50 atomic % and the hydrogen amounts to at least 1 atomic % and, at most, 50 atomic %, said amorphous layer comprising a first region, a second region, and a third region,*

*said first region being at least 10 nm thick, extending inwardly from an outer surface of said amorphous silicon layer and being made of amorphous silicon which has an optical forbidden band gap of at least 1.6 eV and a resistivity of at least $10^{10}\Omega$.cm;*

*said second region being located at least 10 nm from said surface of said amorphous layer, having a thickness of at least 10 nm, and being made of amorphous silicon which contains germanium and which has an optical forbidden band gap that is smaller than that of said first region at the surface of the amorphous silicon and that is at least 1.1 eV; and*

*said third region being located on a side opposite to said surface side formed by said first region and being made of amorphous silicon which has an optical forbidden band gap of at least 1.6 eV and a resistivity of at least $10^{10}\Omega$.cm, and* further comprising a layer for suppressing the injection of charges from the surface side of said amorphous silicon layer.

10. An electrophotographic member according to claim 8 or claim 9, wherein said suppressing layer comprises a material which is SiO, $SiO_2$, $Al_2O_3$, $CeO_2$, $V_2O_3$, $Ta_2O$, $As_2Se_3$, $As_2S_3$, or polyvinyl carbazole.

*11. An electrophotographic member according to claim 8 or claim 9, wherein said germanium is contained in said second region so that said amorphous silicon layer is sensitive to light of wavelengths longer than the long wavelength region of the visible light.*

*12. An electrophotographic member according to claim 8 or claim 9, wherein said germanium is contained in said second region so that said amorphous silicon layer is sensitive to light of semiconductor laser.*

*13. An electrophotographic member according to claim 8 or claim 9, wherein said germanium is substituted for silicon in an amount of up to 49 atomic %.*

*14. An electrophotographic member according to claim 8 or claim 9, wherein at least one of said first region and said third region contains carbon which is substituted for silicon in an amount up to 49 atomic %.*

*15. An electrophotographic member according to claim 8 or claim 9, wherein said amorphous silicon layer is formed by a reactive sputtering process in an atmosphere containing hydrogen.*

*16. An electrophotographic member according to claim 8 or claim 9, wherein at least one of said first region and said third region further contains carbon which is substituted for silicon in an amount up to 30 atomic %.*

*17. In an electrophotographic member comprising:*

*at least a predetermined supporter having a conductive surface; and*

*an amorphous silicon layer being electrically in contact with the conductive surface, containing hydrogen and silicon as indispensable constituent elements thereof, the improvement comprising an amorphous silicon layer in which the silicon amounts to at least 50 atomic % and hydrogen amounts to at least 1 atomic % and, at most 50 atomic %,* the amorphous silicon layer comprising a first, a second and a third region so as to form a narrow band gap region and wide forbidden band gap regions sandwiching the narrow forbidden band gap region, and the three regions are all intrinsic,

*the first region as one of the wide band gap regions being at least 10 nm thick, extending inwardly from an outer surface of the amorphous silicon layer and being made of amorphous silicon containing carbon therein, and having an optical forbidden band gap of at least 1.6 eV and a resistivity of at least $10^{10}\Omega$.cm,*

*the second region as the narrow forbidden band gap region being located at least 10 nm from the surface of the amorphous silicon layer, having a thickness of at least 10 nm, and being made of amorphous silicon which has a optical forbidden band gap smaller than that of the first region at the surface of the amorphous silicon layer and that is at least 1.1. eV, and*

*the third region as the other wide forbidden band gap region being located so as to sandwich the second region cooperating with the first region, being made of amorphous silicon containing carbon therein, having an optical forbidden band gap of at least 1.6 eV and a resistivity of at least $10^{10}\Omega$.cm.*

*18. An electrophotographic member according to claim 17, wherein said amorphous silicon layer is formed by a reactive sputtering process in an atmosphere containing hydrogen.*

*19. An electrophotographic member according to claim 17, further comprising a layer on the side of the supporter in electrical contact with the amorphous silicon for suppressing the injection of excess carriers from the supporter side.*

*20. An electrophotographic member according to claim 17, further comprising a layer for suppressing the injection of charges from the surface side of said amorphous silicon layer.*

*21. An electrophotographic member according to claim 17 or claim 18, wherein said suppressing layer comprises a material which is SiO, $SiO_2$, $Al_2O_3$, $CeO_2$, $V_2O_3$, $Ta_2O$, $As_2Se_3$, $As_2S_3$, or polyvinyl carbazole.*

*22. An electrophotographic member according to claim 17, wherein said second region has a resistivity less than $10^{10}\Omega$.cm.*

*23. An electrophotographic member according to claim 19, wherein said second region contains germanium.*

* * * * *